[11] 3,589,800

[72] Inventor  Hernando Cardona
   600 West 115th St., New York, N.Y. 10025
[21] Appl. No. 830,640
[22] Filed June 5, 1969
[45] Patented June 29, 1971

[54] GONIOSCOPIC LENS
   9 Claims, 4 Drawing Figs.

[52] U.S. Cl. ........................................ 351/16,
   350/96, 350/175, 350/276, 351/1, 351/160
[51] Int. Cl. ........................................ A61b 3/10,
   G02b 5/14, G02b 27/02
[50] Field of Search ........................................ 351/1, 16,
   160; 350/175, 276, 96

[56] References Cited
   UNITED STATES PATENTS
   2,402,216  6/1946  Vennigerholz ............... 350/175
                                    (Sphere Lenses)
   3,039,349  6/1962  Rodgers ................ 350/276 (SLA)
   3,273,445  9/1966  Siegmund .............. 350/276 (SLA)
   3,357,433  12/1967  Fourestier et al. ........ 350/96 X
   FOREIGN PATENTS
   964,567  7/1964  Great Britain ............... 351/16

OTHER REFERENCES
J. G. F. Worst, M. D., " Goniotomy Lens With Internal (Fiber) Illumination," AMERICAN JOURNAL OF OPHTHALMOLOGY, vol. 65, #2, Feb. 1968, (351–16)

*Primary Examiner*—David Schonberg
*Assistant Examiner*—Paul A. Sacher
*Attorney*—Brumbaugh, Graves, Donohue & Raymond

ABSTRACT: A gonioscope for viewing the angle of the anterior chamber of an eye comprises a lens having a concave surface closely matching the surface of the cornea of the eye and adapted to be positioned in engagement with the cornea in use with the axis of the concave surface substantially coincident with the axis of the eye and a convex spherical lens surface having an axis that intersects the axis of the concave surface at an angle of substantially 55°. Associated with the lens is a light-conducting fiber cable that is joined to the spherical lens surface at a point spaced from the axis of the convex surface, the light-conducting fiber cable being oriented and positioned so as to direct light toward a place in the angle radially inward of the zone of the angle being observed.

PATENTED JUN29 1971 3,589,800

INVENTOR
HERNANDO CARDONA
BY
his ATTORNEYS

GONIOSCOPIC LENS

BACKGROUND OF THE INVENTION

This invention relates to a gonioscope for viewing the angle of the anterior chamber of an eye.

A gonioscope is an ophthalmological instrument that is used for viewing the angle of the anterior chamber of an eye, i.e., the peripheral region of the anterior chamber that is located between the cornea and the anterior surface of the iris. Although the gonioscope is used frequently in routine eye examinations, it is an important instrument for the performance of a goniotomy, a surgical operation often employed in the treatment of congenital glaucoma. A goniotomy is preferably performed under direct visualization of the chamber angle so as to obtain proper placement of the incision and avoid trauma to the iris root, ciliary body and lens of the eye.

One type of gonioscope previously proposed and used comprises a relatively large spherical lens having an axis that is coincident with the axis of the eye when it is placed over the eye in use. The lens provides a field of vision of the angle that extends entirely around the chamber angle, and the user shifts his position relative to the patient's eye in order to observe various points around the chamber angle. Regardless of the region of the chamber angle being observed, the line of sight between the observer's eye and the chamber angle of the patient's eye is displaced a substantial distance from and is at a large angle to the optical axis of the lens, and therefore the image is subject to severe aberrations and high refraction. In particular, the image of the portion of the chamber angle that is being observed is located at a point a substantial distance forward of the actual location, and therefore the coordination of the surgical incision in a goniotomy is extremely difficult to accomplish properly. The tendency is for the user to introduce the knife too high and then compensate by guiding it down toward the desired point, thus producing a severe trauma. These and certain other types of gonioscopic lens which are subject to refraction and aberration effects thus have the important disadvantages of providing an image that is not on the line of sight between the observer and the actual point in the chamber angle that is being observed.

Another difficulty with gonioscopes heretofore proposed and used is that many of them do not provide for adequate illumination of the chamber angle. Some gonioscopes do not have any provision for illumination, and some external source of illumination must be employed. There is at least one gonioscope that has been proposed which employs an illuminating device in direct association with the lens. The illumination device is in the form of a small prism built into the lens and a light source built into the handle for directing light to the prism and thence into the chamber angle. The prism is so located that the light is directed to the chamber angle from above and behind the point of observation, relative to the position of the observer using the instrument, and it has been found that such retroillumination of the chamber angle is not entirely satisfactory from the standpoint of a consistently clear image free of reflective effects.

SUMMARY OF THE INVENTION

There is provided, in accordance with the invention, a novel and improved gonioscope that substantially eliminates the problem of refraction and aberration effects that tend to distort and displace the image out of the direct line of sight between the user's eye and the region of the chamber angle being observed and that provides illumination that yields a consistently clear image substantially free of disturbing reflection effects. More particularly, the gonioscope comprises a lens that provides an image of the chamber angle that is aligned on the line of sight between the observer and the portion of the chamber angle actually being observed, the image field of the lens being substantially parallel to and in reasonable proximity to the axis of a convex spherical surface of the lens, and an illuminating system that includes a light-conducting fiber cable which is joined to the lens and is aligned relative to the chamber angle to provide a light beam that is generally parallel to the axis of the convex spherical lens but displaced somewhat below the image field and providing illumination of the chamber angle at a region radially inwardly of the area of the angle actually being observed.

The lens has a concave surface that closely matches the shape of the cornea and is adapted to be placed in engagement with the cornea for use of the gonioscope. The concave surface may, advantageously, have a curvature slightly less than the curvature of the surface of the cornea so that when it is placed in position with the cornea, the center of the surface comes in contact with the cornea first, and thereafter the remaining surface outwardly from the center progressively engages the cornea. In this way, air bubbles cannot be trapped between the concave lens surface and the surface of the cornea. Preferably, the concave surface is spherical and has a radius of from about 8.2 mm. to about 8.5 mm., and the axis of the concave surface is disposed so as to be substantially in alignment with the axis of the eye when the instrument is placed over the cornea for use.

The convex spherical surface of the lens has an axis that intersects the axis of the concave surface at an angle of 55° and is preferably formed on the lens in a manner such that their perimeters come very close together, say, about 1 mm., or less, at a point in the plane of the lens defined by the axes of the convex and concave surfaces. Such relative positions of the concave and convex surfaces provides for locating the line of sight of the lens substantially parallel to the axis of the convex spherical surface, and relatively close to the axis, thus substantially eliminating aberrations and refractions and to the end that the image of the chamber angle observed through the gonioscope lens is almost precisely aligned on the line of sight between the actual chamber angle portion being observed and the eye of the observer. Consequently, the problem of coordinating surgical procedures with the image being viewed is substantially eliminated, inasmuch as the knife may be guided directly to the desired point in the desired direction with hand movements coordinated with the observed image.

The portion of the light-conducting fiber cable associated with the lens may constitute a handle for holding the lens in position in engagement with the eye cornea for use of the gonioscope, and the outer end of the handle portion may be fitted with an adapter for receiving a flexible light-conducting fiber cable associated with a remote light source. In a preferred embodiment, the terminal end of the light-conducting fiber cable where it is attached to the lens is disposed on an axis located in a plane spaced an appropriate distance, say about 5 to 7 mm., from the axis of the convex surface of the lens and parallel to that axis. The terminal end portion is also spaced on one side or the other of the plane of the axes of the concave and convex surfaces, and the axis of such terminal end portion forms an angle with the plane of on the order of 17°. With this position and orientation of the light conductor, the light beam is directed to a zone within the anterior chamber of the eye that is spaced inwardly of the zone of the chamber angle being observed. Thus, the chamber angle is illuminated by direct illumination in the sense that the light comes from a source in front of the region observed, but the beam is not directed fully on the observed region. Such illumination has been found to provide the best results from the standpoint of clarity of the image and minimum disturbing reflections, and is considered to be a substantial improvement over the retroillumination that has been proposed and used in the past, as well as the various forms of illumination by devices not associated with the lens. Another advantage of the light-conducting fiber cable form of illumination is that the light is not a source of heat in the environment of the eye, thus making the surgeon's work more comfortable and consequently less fatiguing.

As a further desirable feature, all parts of the gonioscope other than the concave and convex surfaces of the lens should have a nonreflective coating in order to limit to the greatest degree possible reflective effects within the lens and the entry of light into the lens from sources other than the light conductor.

DESCRIPTION OF THE DRAWINGS

For a better understanding of the invention, reference may be made to the following description of an exemplary embodiment of the gonioscope, taken in conjunction with the figures of the accompanying drawings, in which.

DESCRIPTION OF AN EXEMPLARY EMBODIMENT

Figure 1:
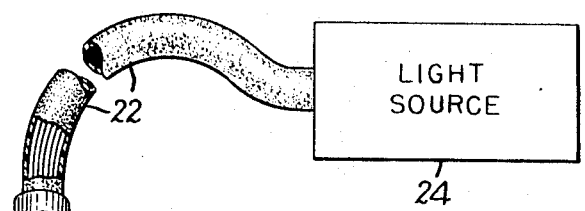
FIG. 1 is a pictorial view of the embodiment.
Figure 2:
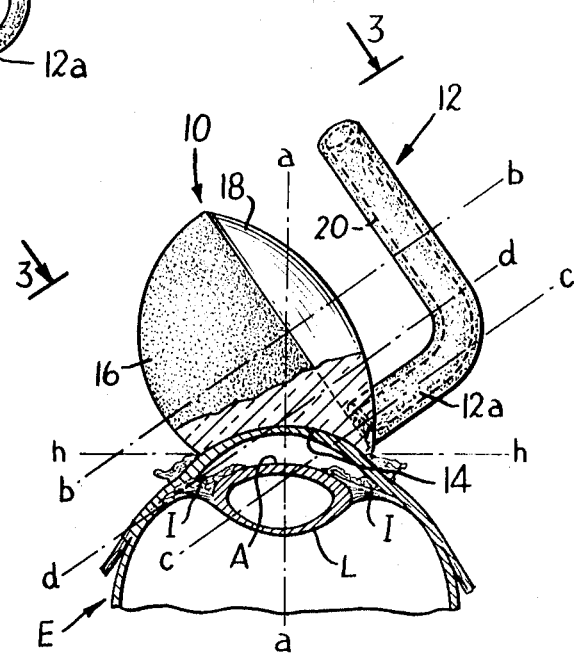
FIG. 2 is a side view, partly in section and partly in elevation, of the embodiment showing the lens in position over an eye for use.
Figure 4:
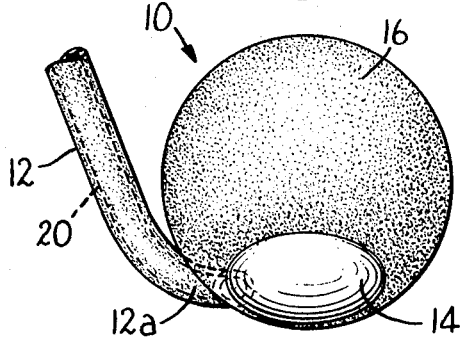
FIG. 4 is a bottom view of the embodiment.

The two basic elements of the gonioscope, according to the invention, are a lens, which is designated generally by the reference numeral 10 in the drawing, and a light conductor 12, the light conductor also serving as a handle for holding the lens. In FIG. 2, the gonioscope is shown in position for use in engagement with the cornea C of an eye E. The gonioscope is used to observe a region of the eye known as the angle of the anterior chamber. In particular, the anterior chamber (A in FIG. 1) is a fluid-filled chamber at the front end of the eyeball located between the cornea C and the lens L. The peripheral zone of the anterior chamber is in front of the anterior portion of the iris I, and the angle of the anterior chamber is that peripheral zone generally between the iris and the cornea.

The lens 10 of the gonioscope is a body of a suitable transparent optical material, a preferred material being a hardened, scratch-resistant plexiglass. For purposes of description of the embodiment, the lens 10 may be considered to have a horizontal axis plane $h–h$ constituted by the intersection between a concave surface surface 14 of the lens having a curvature substantially matching the curvature of the cornea and a generally hemispherical surface 16. The concave surface 14 may be a segment of a sphere having a radius of from about 8.2 mm. to about 8.5 mm., and a chord dimension of about 10 mm. The curvature of such a spherical segment is slightly less than the curvature of the cornea, with the advantageous result that when the instrument is placed against the cornea for use, the center of the concave surface 14 engages the cornea C first, and upon applying light pressure to the gonioscope, the remaining portion of the concave surface 14 outward from the center progressively engages the cornea. Consequently, the tendency for air bubbles to be trapped between the gonioscope lens 10 and the cornea is substantially eliminated. The axis $a–a$ of the concave surface 14, that is, a radius of the spherical segment passing through the center of the surface 14, will in normal use of the gonioscope be substantially aligned with the optical axis of the eye. This condition will be closely met if the size of the lens 10 is such that the concave surface 14 is of a size such as to substantially cover the entire cornea within the conjunctiva of the eye.

The gonioscope lens further includes a convex spherical surface 18. The axis $b–b$ of the surface 18, that is, a radius of the spherical segment passing through the center of the segment, is inclined at an angle of 35° to the horizontal reference plane or, putting it another way, the axis of the convex surface 18 intersects the axis of the concave surface 14 of the lens at an angle of 55°. Preferably, the convex surface 18 has a radius of about 12.5 mm. and has a chord dimension of about 16 mm. As is apparent from FIG. 1, the perimeters of the concave and convex surfaces closely approach each other in the plane of their axes, the point of closest approach being on the order of 1 mm. or less. The dioptric value of the lens advantageously may provide a magnification of 2x, a value which is practical since it permits a series of magnifications when the gonioscope is used with telescopes of microscopes of various powers. As mentioned briefly above, the remaining surface 16 of the lens 110 is spherical, although the precise geometry of the surface 16 is of little importance in respect of the optical properties of the lens.

The lens of the gonioscope, as described above, is considered to have optimum properties. The orientation of the axis of the convex lens surface 18 at the above-mentioned angle to the horizontal reference plane of 35° has been carefully chosen with relation to the geometry, in cross section, of the angle of the anterior chamber of the eye. In particular, the angle between the anterior surface of the iris and the opposite posterior surface portion of the cornea, is, in the average eye, approximately 70°, and the 35° angle is the bisector of that angle. Thus, the line of sight of the lens is parallel to the axis of the lens surface 18 and lies on the bisector of the angle. This is believed to be the optimum condition for observation of the anterior chamber angle.

Figure 3:
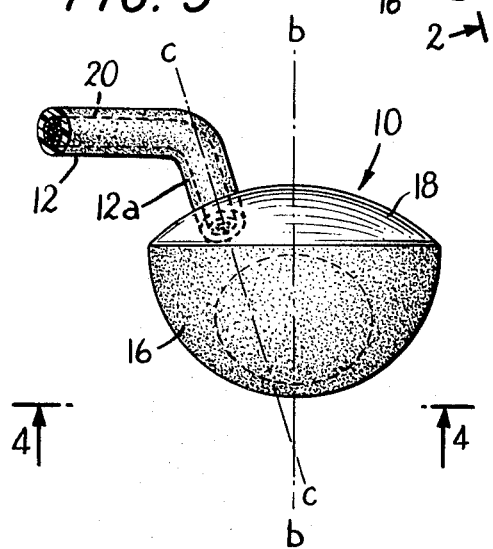
FIG. 3 is an end view of the embodiment taken generally along a plane represented by the lines 3–3 of FIG. 2 and in the direction of the arrows.

As mentioned briefly above, the light conductor 12 of the gonioscope, which also serves as the handle for lens, provides direct internal illumination of the chamber angle. In particular, the handle 12 includes a core 20, constituted by a light-conducting fiber optic element, and a covering of a suitable material, such as plexiglass. The terminal portion 12a of the light conductor or handle, where it is joined to the lens, leads from an approximately 90° bend along an axis $c–c$ that (1) lies in a plane parallel to the axis of the convex lens surface 18 and (2) forms an angle with the plane of the axes ($a–a$ and $b–b$) of the convex and concave surfaces 18 and 14, respectively, so that the beam of light emitted from the light-conducting core 20 of the handle is directed into the anterior chamber of the eye in a region centered a substantial distance from the area of the chamber angle being observed. As indicated in FIG. 3, the angle between the handle portion 12a and the plane of the axes $a–a$ and $b–b$ is, in the embodiment, 17°. With this geometry, the light rays illuminating the part of the chamber angle being observed are at a relatively small angle to the surface of the iris I, and reflection of those rays does not interfere with the observed image. The terminal portion 12a of the handle is cemented to the lens 10 at a point that lies in either of the two lower quadrants of the convex lens surface 18 that are defined by (1) the plane of the axes $a–a$ and $b–b$ of the surfaces 14 and 18 of the lens 10 and (2) a plane perpendicular to the aforesaid plane of the axes.

The user holds the lens in engagement with the cornea and observes the chamber angle along a line of sight $d–d$ from a position generally above and to the right, relative to FIG. 2. If the user prefers to hold the instrument in his right hand, then the handle 12 will be attached in the lower right quadrant, relative to the viewpoint of the observer, whereas if the user prefers to hold the instrument in his left hand, the point of attachment of the handle 12 to the lens will be in the lower left quadrant, again as viewed by the observer. In either instance, the handle has a bend of about 90° and leads from the bend upwardly and outwardly at a convenient angle, again as may be considered most desirable by the user.

The covering material, e.g., plexiglass, over the light-conducting fiber core 20 of the handle 12 may be tapered from a point near the 90° bend and merge into a relatively larger hand-holding portion 12b of a convenient size for comfortable holding of the instrument, and the enlarged portion, may be knurled, or otherwise treated to provide a sure grip between the fingers. The end of the handle is advantageously provided with a receptacle (not shown) for receiving a mating plug (not shown) associated with a flexible fiber light-conducting fiber optic cable 22 leading from a remotely located light source 24, such as a 500-watt projector-type illuminator.

As an alternative to a handle that is equipped to receive a light-conducting fiber cable, the handle may be a hand, pocket-sized flashlight arranged so that the light is beamed at the relatively short length core of light-conducting fiber optic material. Regardless of whether the light source is a remote high-intensity light or a flashlight integral with the handle, the light-conducting fiber optic core of the handle serves to conduct the light into the anterior chamber of the eye in an identical manner, as described above. It has been found that an optimum orientation and location of the terminal portion 12a of the fiber core is on an axis c–c (described above) that is in a plane (1) parallel to and spaced about 6.0 mm. from the axis of the convex lens surface 18 and (2) perpendicular to the plane of the axes of the surfaces 14 and 18, and is at an angle to the plane of the axes surfaces 14 and 18 of about 17°.

It is of considerable advantage to coat all parts of the gonioscope, other than the concave surface 14 and the convex surface 18 of the lens, with a light-absorbing material to eliminate interfering reflections within the lens and also block out light from the handle. For example, the coating may be a black paint or, preferably, a coating of plexiglass containing a lamp black pigment and molded in place over the surfaces of the substrate members. Further, it is advantageous to provide a silver coating over the bend portion of the handle underneath the antireflecting coating to ensure better internal reflection of light in the light-conducting fiber core 20 of the handle.

Thus, there is provided, in accordance with the invention, a gonioscope that provides an effective optical system from the standpoint of producing an image of a portion of the chamber angle that is located substantially on the line of sight between the observer and the portion observed and therefore is substantially free of refraction and aberration effects. Consequently, the lens eliminates the troublesome difficulty with some of the gonioscopes proposed heretofore of providing an image that is not aligned on the line of sight between the observer and the point in the eye being observed. As explained previously, this advantage of the gonioscope of the invention is extremely important when the gonioscope is used for operative procedures, such as a goniotomy, by facilitating the surgeon's ability to control the position and motion of the knife tip with a normal coordination of hand movements under the control of the visual image he sees. Further, the illuminating system of the gonioscope eliminates many of the light reflection interferences encountered with other illuminating systems, such as the previously proposed technique of retroillumination. The gonioscope provides a relatively wide image field that makes it useful for teaching purposes, since two or even three individuals can observe a given region in the chamber angle simultaneously. Also, the relatively wide image field of the lens permits the ready adaptation of camera equipment. The gonioscope may be sterilized in a Zephirin solution or in an ethylene oxide gas chamber, inasmuch as it does not have any parts that are subject to damage by these modes of sterilization.

We claim:

1. A gonioscope for viewing the angle of the anterior chamber of an eye comprising a lens having a concave surface closely matching the external surface of the cornea of the eye and adapted to be engaged with the cornea in use with the axis of the concave surface substantially coincident with the axis of the eye when in use and a convex spherical lens surface having an axis that intersects the axis of the concave surface at an angle of substantially 55°, the concave and convex surfaces being closely spaced at points thereon in the plane defined by the axes thereof; and a rod-type light conductor joined to the convex spherical surface, said conductor being joined to the convex surface at a location thereon spaced from the axis thereof and in a quadrant thereof defined by (1) said plane of the axes of the concave and convex surfaces and (2) a second plane perpendicular to said plane and including the said axis of the convex surface and said quadrant being one of the two quadrants adjacent the said closely spaced points, that portion of the light conductor which is adjacent to the point of its attachment to the convex spherical surface being aligned to direct a light beam centered at a place in the chamber spaced from the portion of the angle being observed, thereby to reduce reflection effects.

2. A gonioscope according to claim 1 wherein the concave surface of the lens is spherical and has a radius of from about 8.20 mm. to about 8.50 mm.

3. A gonioscope according to claim 1 wherein the spherical convex surface of the lens has a radius of about 12.5 mm.

4. A gonioscope according to claim 1 wherein the portion of the light conductor immediately adjacent the point of attachment to the lens is aligned to direct a light beam into the lens along a line lying in the plane (1) perpendicular to the plane of the axes of the concave and convex surfaces of the lens and (2) spaced from the axis of the spherical surface, such line forming an acute angle with the said plane of the axes.

5. A gonioscope according to claim 4 wherein the plane of the light beam is spaced about 6 mm. from the axis of the spherical lens.

6. A gonioscope according to claim 5 wherein the acute angle is about 17°.

7. A gonioscope according to claim 5 wherein the plane of the beam is spaced about 6 mm. from the axis of the spherical lens, and the acute angle is about 17°.

8. A gonioscope according to claim 1 wherein substantially all of the surfaces of the lens other than the said concave and convex spherical lens surfaces are coated with an antireflective material.

9. A gonioscope according to claim 1 wherein the light-conducting cable is coated with an antireflective material.